United States Patent [19]

Lescure et al.

[11] Patent Number: 5,535,661
[45] Date of Patent: Jul. 16, 1996

[54] MECHANICALLY CONTROLLED TORQUE TRANSMISSION MECHANISM AND WEAPON INCLUDING SUCH A MECHANISM

[75] Inventors: Jean-Francois Lescure; Julien Jimenez, both of Bourges, France

[73] Assignee: Giat Industries, Versailles, France

[21] Appl. No.: 364,211

[22] Filed: Dec. 27, 1994

[30] Foreign Application Priority Data

Dec. 27, 1993 [FR] France .................................... 93 15680

[51] Int. Cl.⁶ ........................................................ F41A 9/30
[52] U.S. Cl. ............................ 89/33.25; 192/70.19; 89/45
[58] Field of Search ................................ 89/33.16, 33.17, 89/33.25; 192/70.22, 70.19

[56] References Cited

U.S. PATENT DOCUMENTS

| 3,666,021 | 5/1972 | Whitehouse | 173/12 |
|---|---|---|---|
| 3,687,002 | 8/1972 | Mosli et al. | 89/33.16 |
| 3,798,910 | 3/1974 | Bent | 92/2 |
| 4,093,055 | 6/1978 | Blackburn et al. | 192/116.5 |
| 4,573,395 | 3/1986 | Stoner | 89/33.16 |

FOREIGN PATENT DOCUMENTS

| 0042368 | 12/1981 | European Pat. Off. . |
|---|---|---|
| 0090796 | 5/1983 | European Pat. Off. . |
| 981997 | 6/1951 | France . |
| 47716 | 4/1939 | Netherlands . |
| 284106 | 1/1928 | United Kingdom . |
| 413350 | 7/1934 | United Kingdom . |
| 2051263 | 1/1981 | United Kingdom . |
| 1595837 | 8/1981 | United Kingdom . |
| 2243664 | 11/1991 | United Kingdom . |

*Primary Examiner*—Stephen M. Johnson
*Attorney, Agent, or Firm*—Lowe, Price, LeBlanc & Becker

[57] ABSTRACT

A mechanism for transmitting torque between a drive shaft and an output shaft including a mechanical control element which causes an angular phase offset between the shafts. The mechanism includes a coupling element joining the shafts together. The coupling element includes a member capable of angular travel relative to a first of the shafts which, when mechanically controlled, provides the angular phase offset and control of the travel causing mutual drive of the shafts.

7 Claims, 6 Drawing Sheets

MECHANICALLY CONTROLLED TORQUE TRANSMISSION MECHANISM AND WEAPON INCLUDING SUCH A MECHANISM

The present invention relates mainly to a torque transmission mechanism with mechanical control of phase offset between shafts, and to a weapon, especially mounted on a turret, including such a mechanism.

Torque transmission mechanisms are known making it possible, on mechanical control, to generate an angular phase offset between a drive shaft and an output shaft.

The mechanisms of known type have numerous drawbacks. Their overall size is large, their efficiency in terms of energy is low, their reliability is not always sufficient, their cost price is high and, above all, the time required to begin the phase offset is far from being negligible.

Consequently, an object of the present invention is to offer a mechanically controlled torque tranmission mechanism whose reactions are almost instantaneous.

It is also an object of the present invention to offer such a mechanism having a small overall size.

It is also an object of the present invention to offer such a mechanism with a high efficiency in terms of energy.

It is also an object of the present invention to offer such a mechanism with good reliability.

It is also an object of the present invention to offer such a mechanism with a modest cost price.

These objectives are achieved according to the invention using a mechanism including a drive shaft and an output shaft joined together by a joining piece which has a significant travel as well as means for controlling the travel of the joining piece.

The main subject of the invention is a mechanism for transmitting torque between a drive shaft and an output shaft including mechanical control means for causing an angular phase offset between the said shafts, characterized in that it includes an element for joining the said shafts together, comprising a relative angular travel relative to a first of the said shafts which, when mechanically controlled, provides the angular phase offset and means for controlling the travel causing mutual drive of the said shafts.

Another subject of the invention is a mechanism, characterized in that the joining element includes an internal sleeve comprising means for permanent angular coupling to a second of the said shafts.

Another subject of the invention is a mechanism, characterized in that the travel is formed by helical slideways formed in the internal sleeve into which there penetrates a pin secured to the first of the said shafts.

Another subject of the invention is a mechanism, characterized in that the mechanical control means include an external sleeve rotationally driven to provide the angular phase offset of the said shafts, the said external sleeve comprising means which, when it is rotating, drive in axial translation a cylinder blocking the axial translation of the joining element, especially of the internal sleeve, and thus blocking the travel.

Another subject of the invention is a mechanism, characterized in that the external sleeve includes a means for rotationally driving the said external sleeve, for example peripheral teeth.

Another subject of the invention is a mechanism, characterized in that it includes an outer sheath including longitudinal slots, in that the external sleeve includes helical slideways, and in that the fingers driven by the helical slideways and guided by the longitudinal slots drive the cylinder providing for the locking of the joining element.

Another subject of the invention is a mechanism, characterized in that the helical slideways formed in the internal sleeve have the same direction and the same pitch as the helical slideways formed in the external sleeve.

Another subject of the invention is a weapon including a conveyor for loading ammunition and a motor, characterized in that the motor, on request, provides for the operation of the weapon and the driving of the conveyor via a torque transmission mechanism according to the invention.

Another subject of the invention is a weapon, characterized in that it includes mechanical transmission means providing for the driving of an external sleeve of the torque transmission mechanism with an angle α proportional to the change in aim of the weapon in terms of elevation.

Another subject of the invention is a weapon, characterized in that the conveyor automatically supplies the weapon with ammunition, and in that it is of the linkless type.

The invention will be better understood by means of the following description and appended Figures given by way of non-limiting example in which:

In FIGS. 1 to 10 the same references are used to denote the same elements.

Figure 1:
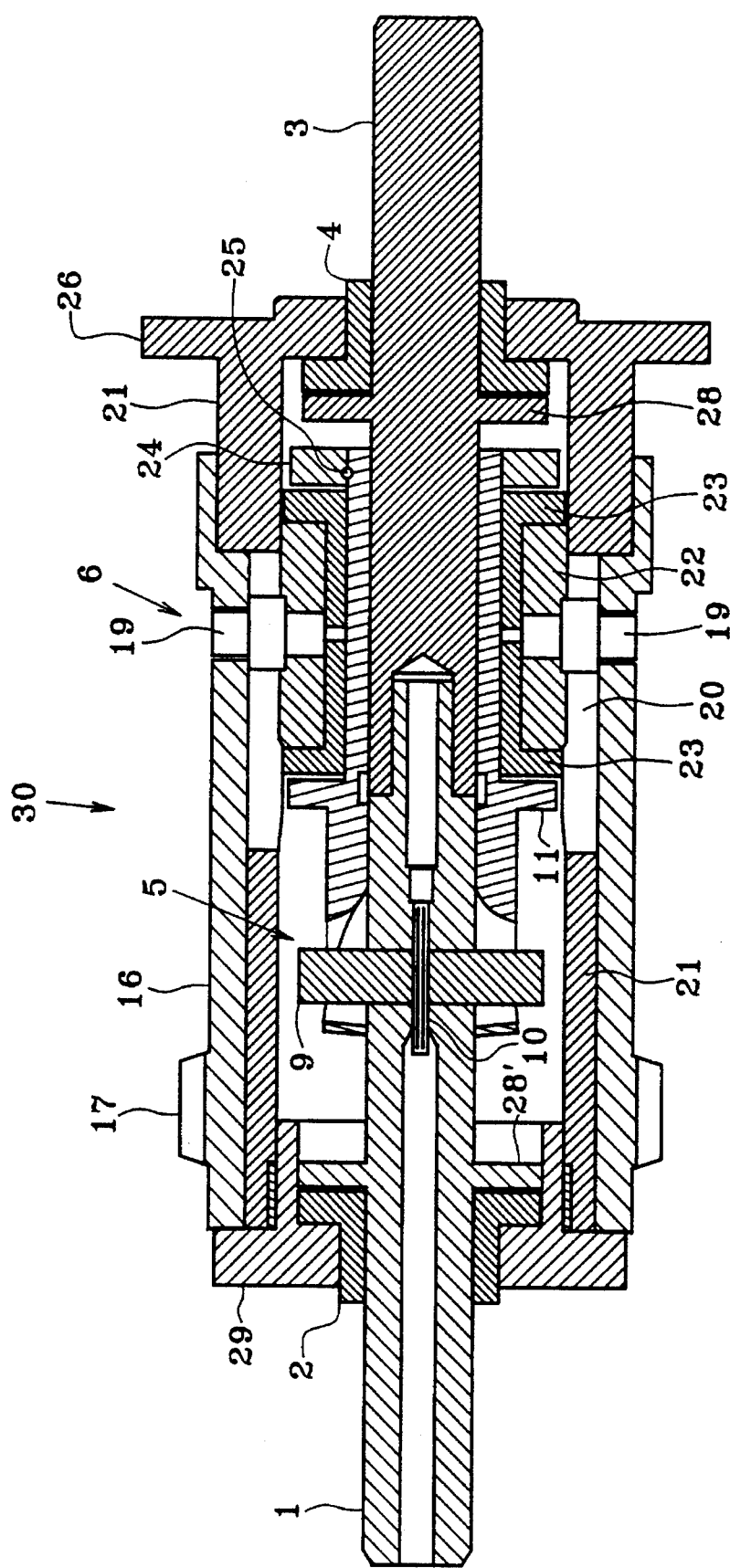
FIG. 1 is a view in longitudinal section of the preferred embodiment of the mechanism according to the present invention.
Figure 2:
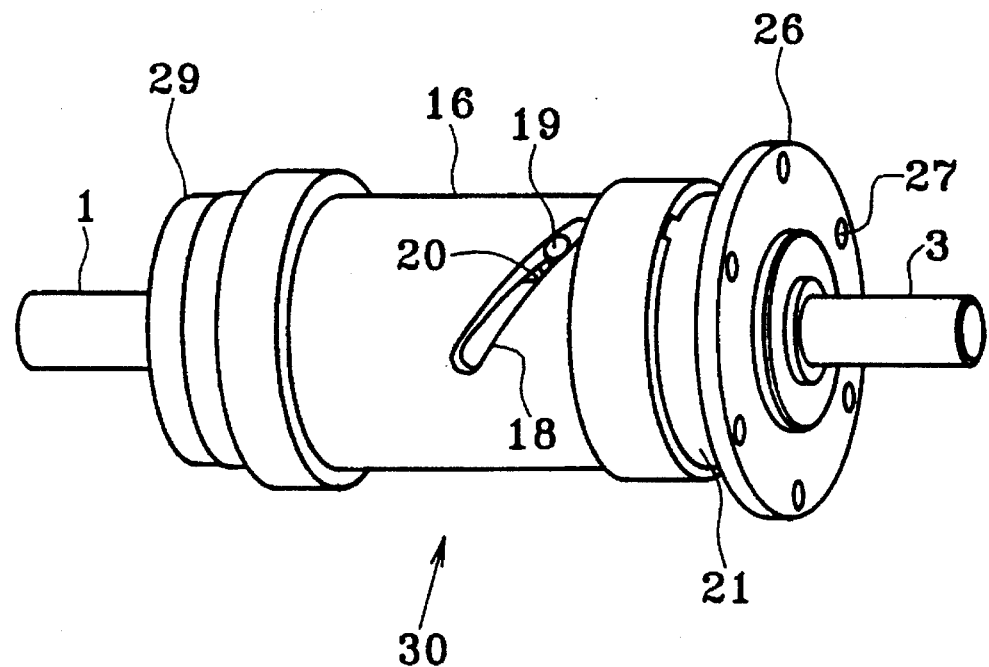
FIG. 2 is a view in perspective of the mechanism of FIG. 1.
Figure 3:
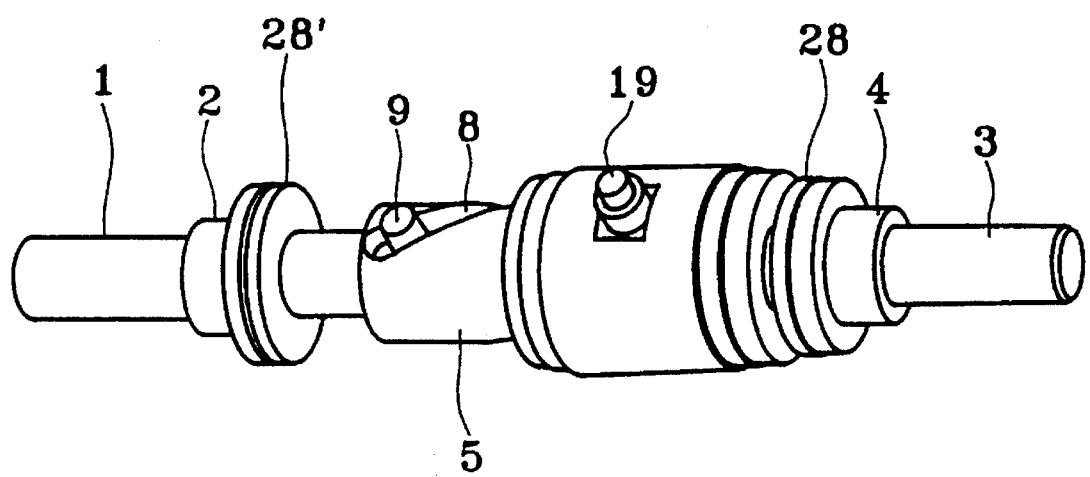
FIG. 3 is a view in perspective of the internal components of the device of FIG. 1.
Figure 4:
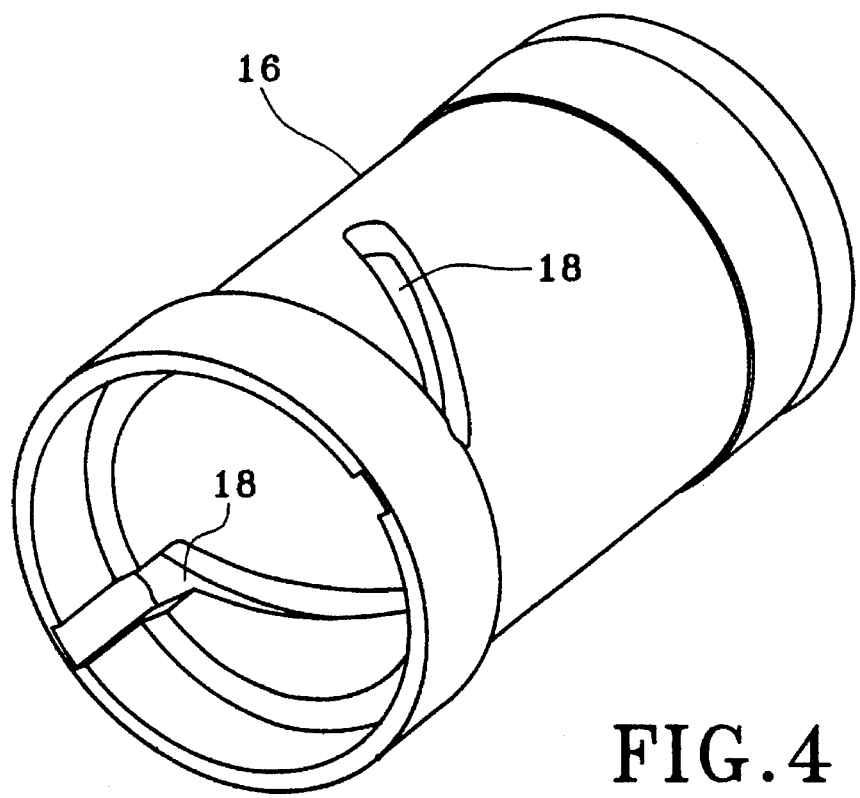
FIG. 4 is a view in perspective of a first sleeve capable of being used in the mechanism according to the present invention.
Figure 5:
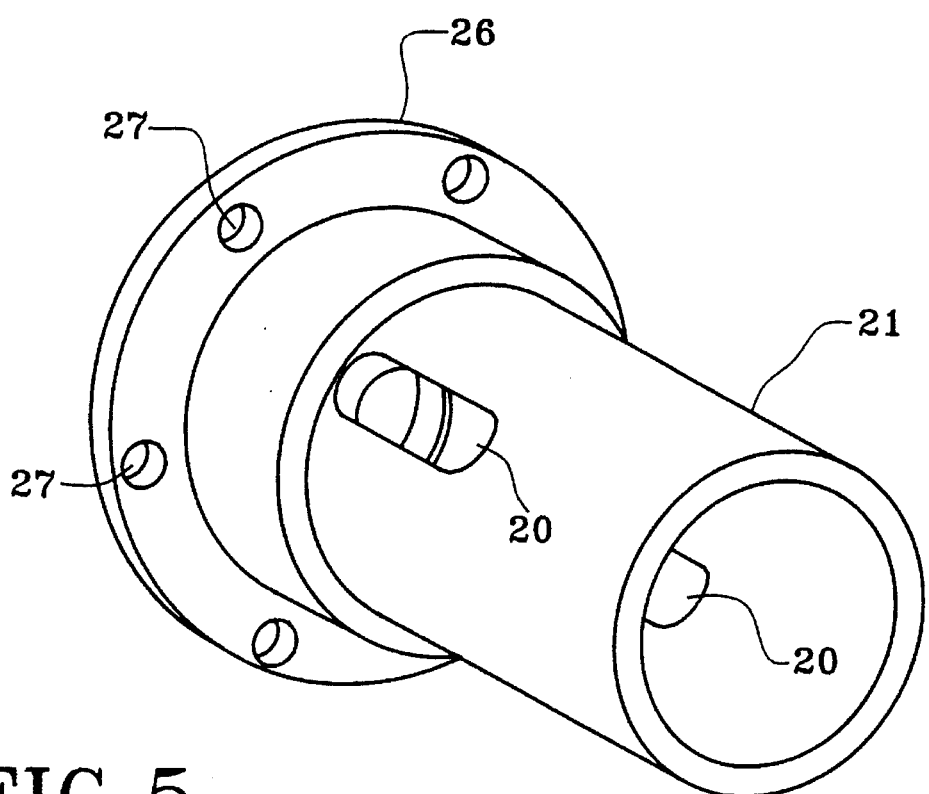
FIG. 5 is a view in perspective of a sheath capable of being used in the mechanism according to the present invention.

In FIG. 1, the preferred embodiment of a mechanically controlled torque transmission mechanism according to the invention can be seen. The mechanism includes a drive shaft 1 advantageously mounted on a bearing, for example a rolling-contact bearing 2 and an output shaft 3 which are [sic] advantageously mounted on a bearing, for example a rolling-contact bearing 4. The shafts 1 and 3 are joined by a joining element 5 which has a great amount of annular and axial travel. A mechanical control device 6 makes it possible to block the travel of the joining element 5, which causes the shaft 3 to be driven by the shaft 1. In the absence of this blocking, and in the limit of amplitude of the angular travel, rotation of the drive shaft 1 does not provide for the driving of the output shaft 3.

Figure 6:
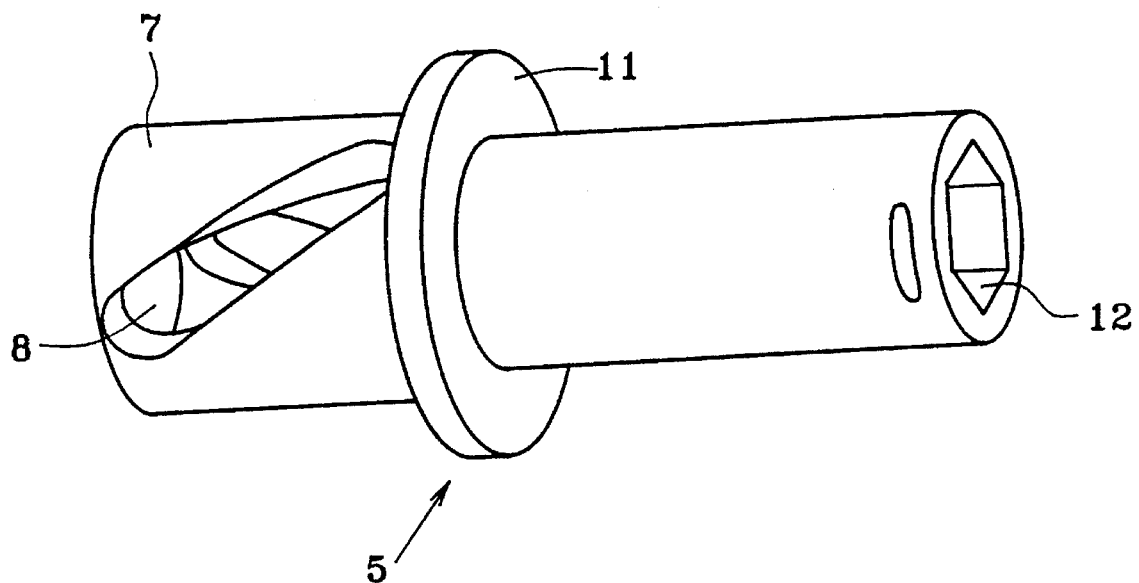
FIG. 6 is a view in perspective of a second sleeve which can be used in a mechanism according to the present invention.

As can be seen in FIG. 6, the joining element 5 advantageously includes a sleeve 7 equipped with two helical slideways 8 for receiving a pin 9 secured to the drive shaft 1 by an elastic pin 10. A collar 11 allows the axial travel of the sleeve 7 and, consequently, that of the helical slideways 8 to be controlled.

Figure 7:
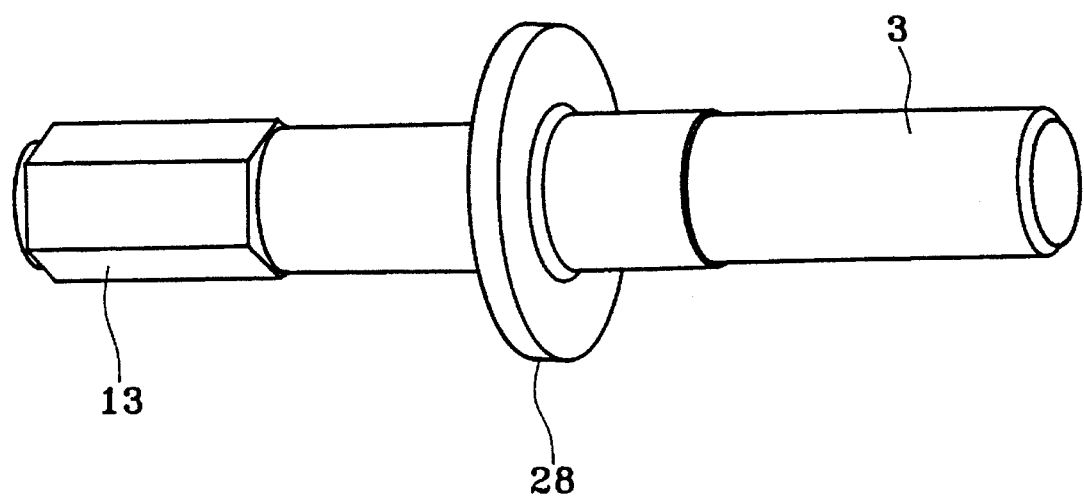
FIG. 7 is a view in perspective of a shaft capable of being used in the device according to the present invention.

The joining element 5 includes coupling means 12, for example splines, or flats which match splines or flats 13 on the output shaft 3 (FIG. 7).

Without this introducing any limiting nature into the embodiment illustrated, the mechanism according to the present invention is controlled by the rotation of a motor 14, providing for the operation of a weapon, especially a gun 15, and the driving, by means of a telescopic constant-velocity joint 34 of an ammunition 32 conveyor 31. When the weapon 15 is aimed in terms of elevation, the conveyor remains immobile. The angular offset which results from this between the conveyor 31 and the weapon 15 causes the constant-velocity joint to rotate, which, in the absence of the mechanism according to the invention would, depending on the direction of variation in elevation, cause the ammunition in the conveyor to move backwards (lowering the elevation) or forwards (increasing the elevation) with, in the latter case, a risk of jamming. The ammunition moving back following a lowering of aiming in terms of elevation, may prove just as prejudicial when the ammunition is taken up by an automatic loading device 35, the ammunition not being situated in its desired location. It is desirable to avoid the output shaft 3 being driven by the rotation of the drive shaft 1, the driving being brought about by the rotational movement of the gun in a vertical plane (aiming in terms of elevation). The angle of rotation of the gun 15 is applied to an external sleeve 16 of the mechanism, for example in the region 8 of teeth 17. The external sleeve 16 has two diametrically opposed helical slideways 18 providing for the driving of the fingers 19 which are guided in translation by longitudinal slots 20 made in an outer sheath 21 on which the external sleeve 16 is mounted so it can rotate. The fingers 19 provide for the translational drive of a cylinder 22 providing for the axial control of the joining element 5. In the preferred embodiment, the cylinder 22 is mounted so it can rotate about the internal sleeve 7 by means of two bearings, for example two rolling-contact bearings 23.

Advantageously, the cylinder 22 is trapped by a ring 24 pinned to the sleeve 7 by an elastic pin 25. The outer sheath 21 advantageously includes a fastening flange 26 including openings 27 for the passage of bolts. Advantageously, the shaft 3 includes a collar 28 mounted as a limit stop providing for its axial blockage on the same side as the bearing 4 and as the flange 26 of the outer sheath 21, blockage in the other direction being obtained by the junction of the shafts 1 and 3 which are, additionally, guided one relative to the other. The shaft 1 advantageously includes a collar 28' mounted as a limit stop providing for its axial blockage.

Advantageously, the mechanism 30 according to the present invention is closed on the same side as the drive shaft 1 by a threaded plug 29 screwed onto the sheath 21.

The mechanism 30 according to the invention is particularly compact and reliable, consumes very little energy and has almost instantaneous reactions to a mechanical control applied to the external sleeve 16.

Figure 8:
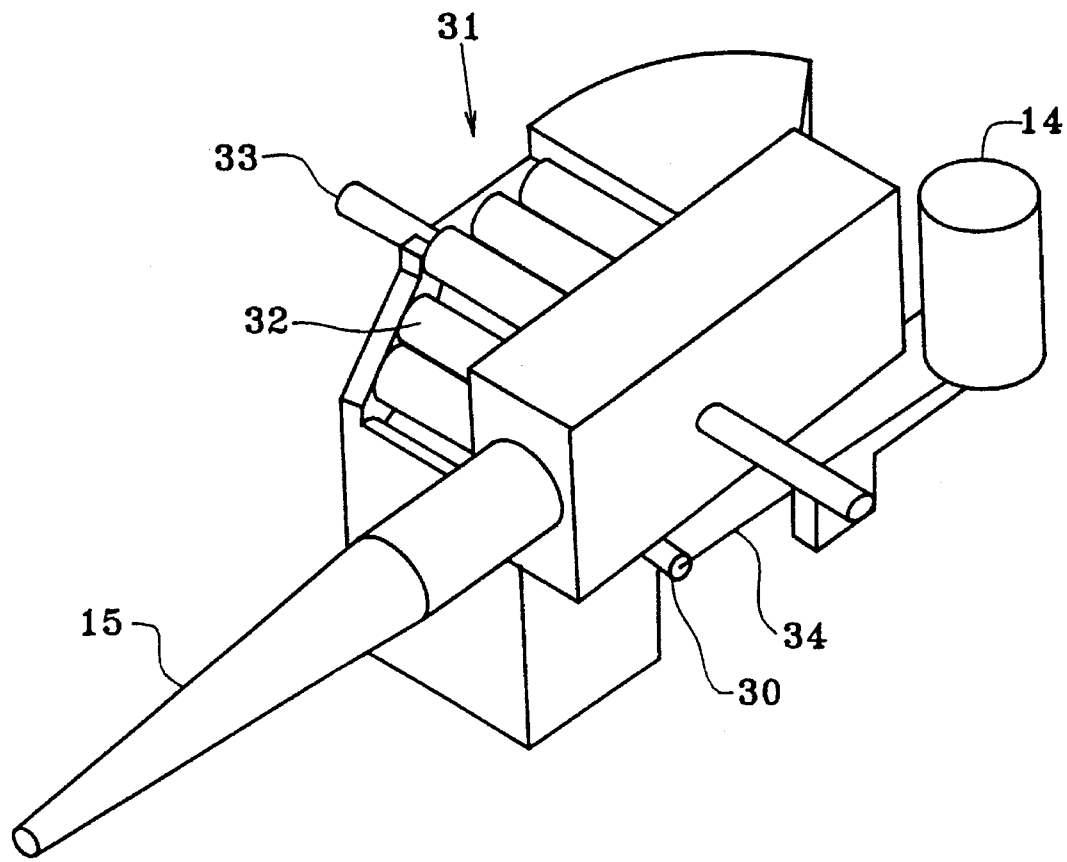
FIG. 8 is an overall view in perspective of a gun according to the present invention.
Figure 10:
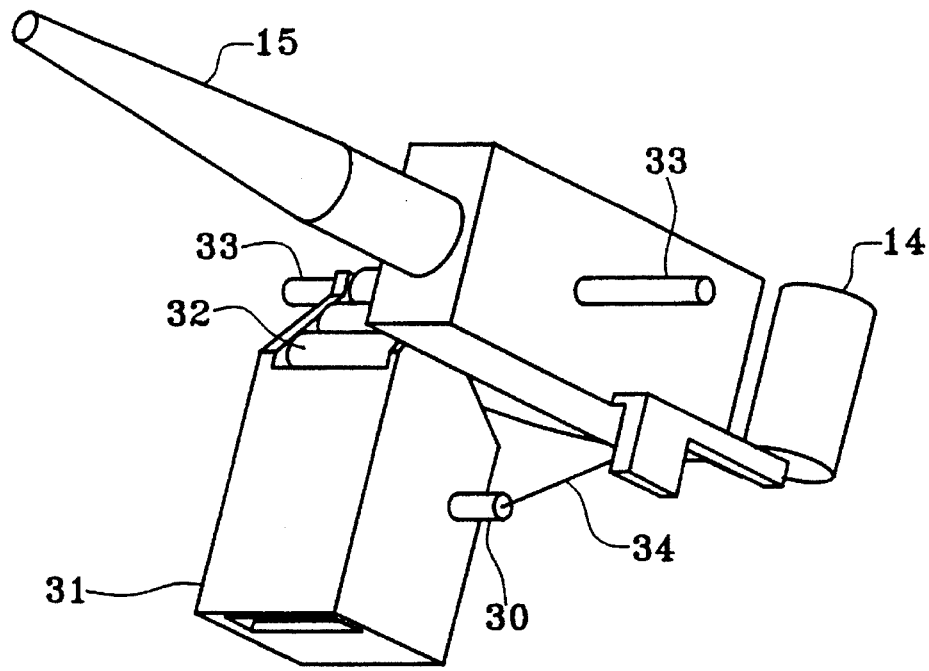
FIG. 10 is a view in perspective of the gun of FIG. 8 aimed with an angle of elevation of 0°.
Figure 9:
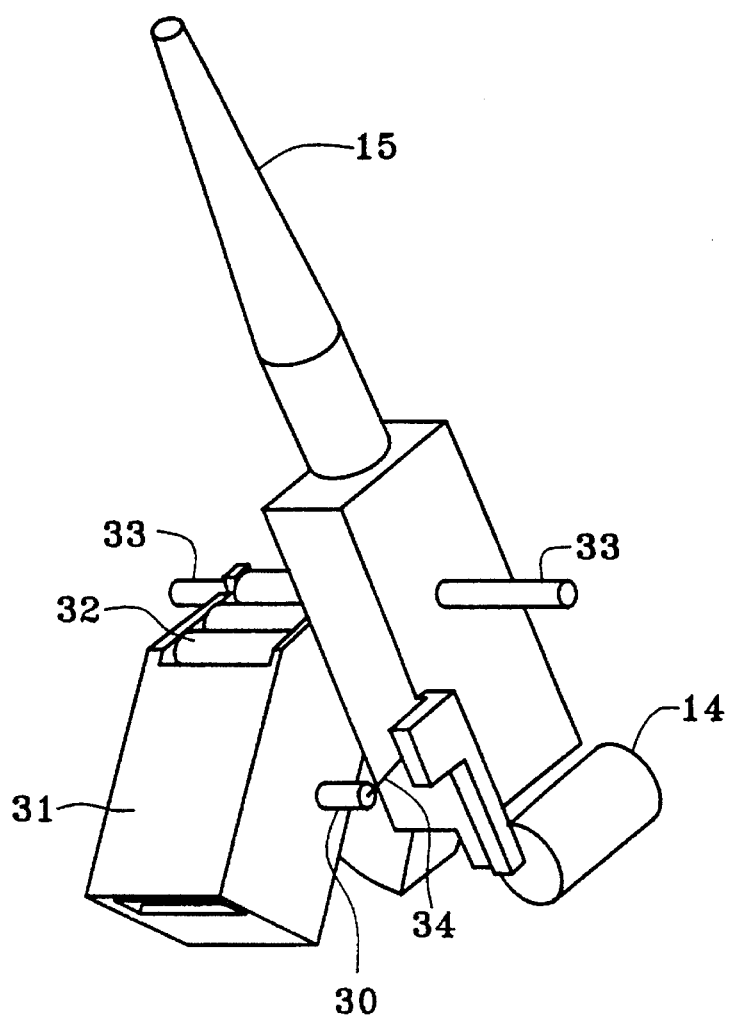
FIG. 9 is a view in perspective of the gun of FIG. 8 aimed with an angle of elevation of 45°.

This mechanism may advantageously be implemented to provide for the driving of a conveyor 31 for feeding the weapon 15 with ammunition 32, the advantageous embodiment of which is illustrated in FIGS. 8 to 10.

The weapon 15, for example a gun whose calibre is 45 mm, advantageously mounted on a turret (not represented) is fed with ammunition 32 by the linkless conveyor 31. The motor 14 provides for the operation of the weapon 15, especially the forwards movement of the ammunition 32 by means of a telescopic constant-velocity joint represented diagrammatically as 34 and of a transmission mechanism 30 according to the invention. It is necessary to avoid a simple change in elevation of the weapon 15 about a pivot axis 33 causing the ammunition 32 to be driven into the conveyor 31, while in the absence of firing it should remain immobile in the conveyor 31. In order to do this, the angular travel of the sleeve 7 formed by the helical slideways 8 corresponds to the travel of the weapon 15 in terms of elevation; for endpoint aiming, corresponding, for example, to 0° and 45°, the pin 9 goes to opposite ends of the helical slideways 8. Likewise, a rotational link between the external sleeve 16 and the weapon 15 is established. The change in elevation of the weapon 15 by an angle α causes the teeth 17 of the sleeve 16 to rotate through a proportional angle, the coefficient of proportionality advantageously being equal to 1.

In this case, the helical slideways 8 and 18 have the same direction and the same pitch. However, the use of different pitches and/or directions for the slideways 8 and 18, so as to obtain a desired coefficient of proportionality, does not depart from the scope of the present invention. Likewise, the number of teeth of the toothing 17 on the sleeve 16 may be chosen to obtain the desired compensation.

Thus, when aiming the weapon 15 in terms of elevation, the external sleeve 16 pivots and by means of the fingers 19 alters the position of the cylinder 22 and therefore of the inner sleeve 7 which slides along the drive shaft 1. The rotation of the drive shaft 1 causes the rotation of the pin 9 in the helical slideways 8 of the sleeve 7 without the latter rotating. Thus the shaft 3 is prevented from being driven. As a result, by virtue of the sliding of the sleeve 7 inside the mechanism 30 according to the present invention, an angular phase offset is created between the drive shaft 1 and the output shaft 3. The rotational movement which could have been transmitted by the output shaft 3 to the conveyor 31 has been completely absorbed by the coincidence of the sliding movement of the internal sleeve 7 of the linking element 5 and the rotational movement of the pin 9 connected to the drive shaft 1 in the helical slideways 8.

As a result, as was desired, during the pivoting of the weapon 15 in terms of elevation, no movement was supplied to the output shaft capable of driving the conveyor 31. However, it is of course possible, when desired, for example during firing, to ensure that the weapon 15 is supplied with ammunition 32 during its aiming in terms of elevation. It suffices to actuate the loading mechanism 35 in the conventional way with the constant-velocity joint 34 being driven by the motor 14. The mechanism 30 according to the invention provides merely for compensation due to the change in aim in terms of elevation, the additional rotation of the drive shaft 1 being wholly transmitted to the output shaft 3 in this case providing for the driving of the conveyor 31.

Likewise, when the weapon is immobile in terms of elevation, rotation of the drive shaft 1 drives the rotation of the output shaft 3. In fact, the outer sleeve 16 is immobile, fixing the position of the cylinder 22. The cylinder 22 provides for the axial blocking of the internal sleeve 7 of the joining element 5. Rotation of the motor 14 drives the drive shaft 1 secured to the pin 9 which, by bearing on the helical slideways 8 rotationally drives the sleeve 7 (blocked axially by the cylinder 22). The sleeve 7 rotationally drives the output shaft 3 via coupling means 12 and 13. The rotational movement transmitted by the motor 14 to the drive shaft 1 is therefore wholly transmitted to the output shaft 3 which drives the ammunition 32 conveyor 31.

It is clearly understood that the invention is not limited to the use of helical slideways 8 and 18 and/or of the slots 20 for driving and guiding the various components of the mechanism 30.

The invention applies especially to the transmission of torque with blocking or compensation in a limited angular travel. In general, the mechanism according to the present invention applies to the mechanical industry and makes it possible, for example, to adjust a shaft line. For example, the mechanism according to the present invention makes it possible to adjust clearances or refine the angular positions of a complex cinematic chain.

The mechanism according to the present invention includes three mechanical input/output ports formed, for example, by the shafts 1 and 3 as well as by the external sleeve 16.

The two mechanical control signals are advantageously applied to two input ports, the third port acting as the output port on which is available, for example, the sum or the difference, possibly weighted, of the phase offset angles applied to the input ports.

In the example described, the drive shaft 1 and the external sleeve 16 are used as input ports, and the output shaft 3 is used as an output port. It is clearly understood that a mechanism using the shaft 1 and the external sleeve 16 as input ports, and the shaft 3 as an output port, or the shafts 1 and 3 as input ports and the sleeve 16 as an output port or even the shaft 3 and the sleeve 16 as input ports and the shaft 1 as an output port does not depart from the scope of the present invention.

The present invention applies mainly to the driving of an ammunition conveyor, on request.

We claim:

1. A mechanism for transmitting torque between a drive shaft and an output shaft, comprising said drive shaft and said output shaft and including mechanical control means for causing an angular phase offset between said shafts, said control means having an element for joining said shafts together, said element having a first slideway enabling one of said shafts to rotate relative to the other shaft to enable said angular phase offset to occur, and second control means for causing mutual drive of said shafts, said second control means including an external sleeve driven in rotation to also provide said angular phase offset of said shafts, said second control means including an outer sheath disposed within said external sleeve and having longitudinal slots, second slideways formed in said external sleeve and a cylinder disposed in an extension of the sheath for blocking axial translation of the joining element, said cylinder being equipped with fingers imparting movement to the cylinder through interaction with said slideways and said slots.

2. Mechanism according to claim 1, wherein said joining element includes an internal sleeve comprising means for coupling said internal sleeve to one of said shafts.

3. Mechanism according to claim 2, wherein said external sleeve comprises means for driving said cylinder in axial translation during rotation of said external sleeve, said external sleeve being driven in rotation to cause angular travel of said shafts.

4. Mechanism according to claim 3, wherein said first slideways are formed in said internal sleeve and have the same direction and the same pitch as the second slideways formed in said external sleeve.

5. A weapon, comprising a conveyor for loading ammunition; a motor; and a torque transmission mechanism operated by the motor to provide for the operation of the weapon and the driving of the conveyor, said torque transmission mechanism, comprising a drive shaft and an output shaft and including mechanical control means for causing an angular phase offset between said shafts, said control means having an element for joining said shafts together, said element having a first slideway enabling one of said shafts to rotate relative to the other shaft to enable said angular phase offset to occur, and second control means for causing mutual drive of said shafts, said second control means including an external sleeve driven in rotation to also provide said angular phase offset of said shafts, said second control means including an outer sheath disposed within said external sleeve and having longitudinal slots, second slideways formed in said external sleeve and a cylinder disposed in an extension of the sheath for blocking axial translation of the joining element, said cylinder being equipped with fingers imparting movement to the cylinder through interaction with said slideways and said slots.

6. Weapon according to claim 5, further comprising mechanical transmission means for driving said external sleeve through an angle $\alpha$ being proportional to the change in aim of the weapon in terms of elevation.

7. Weapon according to claim 5, wherein said conveyor automatically supplies the weapon with ammunition, and is of a linkless type.

* * * * *